3,248,373
URETHANES CONTAINING BIS(BETA-HYDROXY-ALKYL)CARBAMATE AS A CHAIN EXTENDER

Charles Minor Barringer, Chadds Ford, Pa., assignor to E. I. du Pont de Nemours and Company, Wilmington, Del., a corporation of Delaware
No Drawing. Filed Nov. 14, 1961, Ser. No. 152,160
9 Claims. (Cl. 260—77.5)

This invention relates to novel cured polyurethane polymers and to a process for their production. More particularly this invention relates to new cured polyurethane polymers and to a process for their production utilizing novel curing agents.

It is an object of the present invention to provide novel cured polyurethane polymers. A further object is to provide cured polyurethane polymers which display good tear resistance. A still further object is to provide a process for preparing such novel polyurethane polymers. Other objects will appear hereinafter.

These and other objects of this invention are accomplished by preparing cured polyurethane elastomers by reacting about 1.0 mole of a polymeric glycol having a molecular weight between about 750 and 10,000; 0 to 1.0 mole of an aliphatic polyol having a molecular weight below about 350, up to about 2.0 moles of a bis(beta-hydroxyalkyl)carbamate having the structure

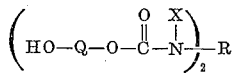

where R is a divalent aliphatic radical having two to ten carbon atoms and free from isocyanate-reactable substituents, X is hydrogen, alkyl, and when taken together alkylene (i.e.; the X's with the nitrogen to which they are attached form a heterocyclic diamine), Q is

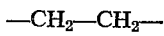

or

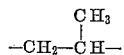

and an organic polyisocyanate; the proportions of said reactants being selected so that the ratio of the number of —NCO groups to the number of hydroxyl groups has a value ranging from 1.0 to 1.2. All X substituents, except when hydrogen is used, are preferably selected from the lower alkyl and alkylenes.

The essence of the present invention relates in the use of a bis(beta-hydroxyalkyl)carbamate as a curing agent for a polyurethane polymer which is prepared from an organic polyisocyanate, a polymeric glycol, and, optionally, an aliphatic polyol. These carbamates are made by reacting two molar proportions of ethylene carbonate or 1,2-propylene carbonate or mixtures thereof with one molar proportion of an organic diamine having the formula

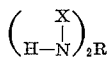

where X and R have the same meaning as above. This reaction can be carried out at atmospheric pressure in refluxing tetrahydrofuran solution. Reaction times of 1 to 10 hours are satisfactory. The carbamate thus formed is isolated by removing the tetrahydrofuran under vacuum. Representative examples of these diamines include: ethylene diamine; 1,2-diaminopropane; trimethylenediamine; N-methyl ethylenediamine; 1,2-butylenediamine; tetramethylenediamine; 2,3-diaminobutane; isobutylenediamine; N-ethyl ethylenediamine; pentamethylenediamine; 2-methyl-1,2-diaminobutane; 2-methyl-1,4-diaminobutane; 2,2-dimethyl-1,3-propanediamine; hexamethylenediamine; decamethylenediamine; 1,2-diaminocyclobutane; 1,3-diaminocyclohexane; 1,4-diaminocyclohexane; 1,4-diaminomethylcyclohexane; 1,4-diaminoethylcyclohexane; N-ethyl-1,4-cyclohexanediamine; piperazine; 3,5-dimethyl piperazine; m-xylylenediamine; menthane diamine; and mixtures thereof in any proportion.

The novel polyurethane polymers of the present invention can be prepared by a number of procedures including sequential or simultaneous mixing of the reactants described above in accordance with the above-defined proportions. Thus, these polyurethane polymers can be made by mixing together at one time an orgnaic polyisocyanate, a polymeric polyol, an aliphatic polyol, and a carbamate and thereafter reacting the composition obtained. In a representative alternative procedure, the organic polyisocyanate can be reacted with the polymeric polyol so as to form an NCO— terminated polyurethane polymer which is then finally reacted with a bis(beta-hydroxyalkyl)carbamate and an aliphatic polyol. Since the reactants can be added in any order, further alternatives will be readily apparent to those skilled in the art.

In preparing these novel polyurethane polymers, the proportion of reactants should be selected so that the value of the ratio of the total number of —NCO groups to the total number of —OH groups ranges between about 1.0 to 1.2.

It is desirable to maintain homogeneity of the reactants from the time when they are mixed together until the time when they have completely reacted to form the final novel cured polyurethane. Those skilled in the art can readily select mixing times and reaction temperatures suitable for this purpose. In general, when the polyurethanes are prepared by simultaneous mixing of the reactants, temperatures of from about 100° C. to 160° C. may be employed over a period of time of from about 5 minutes to 180 minutes. Temperatures of between 50° C. and 150° C. are convenient to use when the bis(beta-hydroxyalkyl)carbamate is added to a fluid isocyanate-terminated polyurethane prepared by reacting the organic polyisocyanate with the polymeric glycol and, if desired, the aliphatic polyol compound.

After the reactants have been mixed, it is generally desirable to deaerate the mixture at temperatures of from about 50° C. to 120° C. The fluid composition which is obtained by mixing the reactants eventually changes to a non-plastic, cured solid. The temperature must be high enough during this period to prevent phase separation in the reaction mass. Operating convenience will determine how much higher the temperature can be. The higher the temperature, the shorter will be the pot life of the fluid composition and the total reaction time. The incorporation of catalysts for urethane formation, such as triethylenediamine, metal carboxylates (e.g. lead naphthenate stannous carboxylates, dialkyl tin carboxylates), diethylcyclohexylamine, stannous chloride or ferric acetyl acetonate decreases the pot life and total reaction time without affecting the quality of the ultimate cured polyurethane. Those skilled in the art can readily determine the pot life and the reaction conditions for a particular composition by empirical means. Representative reaction times (often called cure times because a vulcanizate results) includes: 2–20 hours at 100° C. (catalyzed). If desired, conventional pressures (e.g. 400–600 p.s.i.) may be applied during the molding of films and the like.

As noted above, the cured polyurethane polymers of this invention may be prepared by mixing a bis(beta-hydroxyalkyl)carbamate with an already formed isocyanate-terminated polyurethane prepared by reacting the organic polyisocyanate with the polymeric glycol and, optionally, the aliphatic polyol compound. If desired, the polymeric glycol and the aliphatic polyol can be employed as a mixture although it is to be understood that some or all of them may be separately reacted and the products obtained blended to give the desired fluid isocyanate-terminated polyurethane composition. Agitation is normally used to provide thorough mixing of the reactants and to aid in the temperature control. The NCO—terminated polyurethane is made at a temperature between about 25° C. and 150° C. using a reaction time of from ½ to several hours. In general, it is preferred to carry out the reaction at 80° C. for a period of about 4 hours. It is to be understood that the lower temperatures require longer reaction times and at temperatures higher than about 100° C. an isocyanate-terminated composition of increased viscosity is obtained. If desired, the reaction may be carried out in more than one step. Thus, a hydroxyl-terminated polyurethane can be made by reacting the organic polyisocyanate with a molar excess of one or both of the polyols. This polyurethane in turn can then be reacted with additional organic polyisocyanate or isocyanate-terminated polyurethane to give the desired NCO— terminated polyurethane.

The cured polyurethane polymers of this invention can be prepared by carrying out part or all of the reaction between the above-described reactants in an inert solvent. The cured polyurethane can be isolated from the solvent by conventional mechanical means such as spray drying, drum drying or evaporation. The solvent should be free from groups containing Zerewitinoff active hydrogen atoms (e.g.

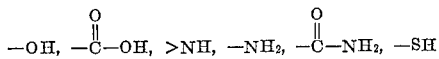

groups). Representative examples of suitable solvents include lower dialkyl ketones (such as methyl isobutyl ketone), lower alkyl esters (such as ethyl acetate), aromatic hydrocarbons (such as toluene and xylene), aliphatic hydrocarbons (such as hexane), chlorinated hydrocarbons (such as trichloro or tetrachloroethylene), cyclic ethers (such as tetrahydrofuran). Those skilled in the art can readily select the solids content which will depend on operating convenience.

In preparing the polyurethane polymers of the present invention, any of a wide variety of polyisocyanates can be employed either alone or as isomer mixtures or as mixtures of different polyisocyanates. Aromatic, aliphatic, and cycloaliphatic diisocyanates and combinations of these types are useful. Arylene diisocyanates, that is those in which each of the two NCO groups is attached directly to an aromatic ring, are preferred.

Representative polyisocyanate compounds include:

toluene-2,4-diisocyanate,
1,5-naphthalene-diisocyanate,
cumene-2,4-diisocyanate,
4-methoxy-1,3-phenylenediisocyanate,
4-chloro-1,3-phenylenediisocyanate,
4-bromo-1,3-phenylenediisocyanate,
4-ethoxy-1,3-phenylenediisocyanate,
2,4'-diisocyanatodiphenylether,
5,6-dimethyl-1,3-phenylenediisocyanate,
2,4-dimethyl-1,3-phenylenediisocyanate,
4,4'-diisocyanatodiphenylether,
benzidinediisocyanate,
4,6-dimethyl-1,3-phenylenediisocyanate,
9,10-anthracenediisocyanate,
4,4'-diisocyanatodibenzyl,
3,3-dimethyl-4,4'-diisocyanatodiphenylmethane,
2,6-dimethyl-4,4'-diisocyanatodiphenyl,
2,4-diisocyanatostilbene,
3,3'-dimethyl-4,4'-diisocyanatodiphenyl,
3,3'-dimethoxy-4,4'-diisocyanatodiphenyl,
1,4-anthracenediisocyanate,
2,5-fluoroenediisocyanate,
1,8-naphthalenediisocyanate,
1,3-phenylenediisocyanate,
methylenebis(4-phenylisocyanate),
2,6-diisocyanatobenzfuran;
2,4,6-toluenetriisocyanate, and
2,4,4'-triisocyanatodiphenyl-ether.

Still other representative organic isocyanates include: nitraza diisocyanates (described in U.S. Patent 2,978,476); nitro isocyanates (described in U.S. Patent 2,987,475); nitro-amino diisocyanates (described in U.S. Patent 2,978,474). Mixtures of any of the foregoing organic polyisocyanates can be employed when desired.

The polymeric glycols which may be used in the present invention include: polyalkyleneether glycols, which are preferred, polyalkylene-aryleneether glycols, polyalkyleneether-thioether glycols, polyalkylene-arylene ether-thioether glycols, polyester glycols, and polyhydrocarbon glycols. Mixtures of the polymeric glycols can be used when desired.

The polyalkyleneether glycols can be represented by the formula $HO(RO)_nH$ wherein R is alkylene radical which need not necessarily be the same in each instance and $n$ is an integer. Representative gylcols include polyethyleneether glycol, polypropyleneether glycol, polytrimethyleneether glycol, polytetramethyleneether glycol, polypentamethyleneether glycol, polydecamethyleneether glycol, polytetramethyleneformal glycol and poly-1,2-dimethylethyleneether glycol. Mixtures of two or more polyalkyleneether glycols may be employed if desired.

The polyalkyleneether-thioether glycols may be represented by the formula $HO(GY)^aH$ wherein G represents hydrocarbon radicals at least some of which are alkylene, Y represents chalcogen atoms some of which are sulfur and the rest oxygen, and $a$ is an integer sufficiently large so that the molecular weight of the polymer is about 750 to 10,000. The following are representative examples:

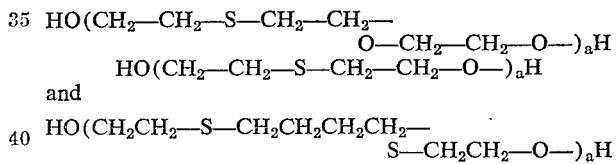

These glycols may be prepared by condensing together various glycols and thiodiglycol in the presence of a catalyst such as p-toluene sulfonic acid.

The polyalkylene-aryleneether glycols are similar to the polyalkyleneether glycols except that some arylene radicals are present. The phenylene, naphthalene and anthracene radicals may be used with or without substitutents such as alkyl or alkylene groups, and, in general there should be at least one alkyleneether radical having a molecular weight of about 500 for each arylene radical which is present. When part of the ether oxygens are replaced with sulfur, a polyalkylene-arylene-ether-thioether glycol results, which also may be used in the subject composition.

The polyester glycols may be made by the polymerization of cyclic lactones such as ε-caprolactone or by the condensation polymerization from a dicarboxylic acid and a molar excess of an organic diol. Optionally, a small amount of a higher functional polyol (e.g. trimethylolpropane) may be included. Representative examples of useful diols include ethylene glycol, propylene glycol, trimethylene glycol, 1,2-butylene glycol, 1,3-butanediol, 1,4-butanediol, 1,5-pentanediol, 1,2-hexylene glycol, 1,10-decanediol, 1,2-cyclohexanediol, 2-butene-1,4-diol, 3-cyclohexene-1,1-dimethanol, 4-methyl-3-cyclohexene-1,1-dimethanol, 3-methylene-1,5-pentanediol, diethylene glycol, (2-hydroxyethoxy)-1-propanol, 4-(2-hydroxyethoxy)-1-butanol, 5-(2-hydroxypropoxy)-1-pentanol, 1-(2-hydroxymethoxy)-2-hexanol, 1-(2-hydroxypropoxy)-2-octanol, 3-allyloxy-1,5-pentanediol, 2-[(allyloxy)methyl]-2-methyl-1,3-propanediol, [(4-pentenyloxy)-methyl]-1,3-propanediol, 2-methyl-2-[(10-undecenyloxy)-methyl]-1,3-propanediol, 3-(o-propenylphenoxy)-1,2-propanediol, thiodiglycol and 2,2'-[thiobis(ethyleneoxy)]-diethanol. If desired, mixtures of two or more of these low molecular weight diols may be used. Representative examples of useful dicarboxylic acid are oxalic acid, malonic acid, succinic acid, glutaric acid, adipic acid, pimelic acid, suberic acid, azelaic acid, sebacic acid, fumaric acid, maleic acid, and phthalic acid. Anhydrides of dicarboxylic acids may be employed in place of the acids; succinic anhydride and phthalic anhydride are representative examples. If desired, mixtures of two or more of these dicarboxylic acids and/or anhydrides can be used.

In addition to the above, one may use hydroxyl-terminated organic polymers (preferably having molecular weights between about 750 and 4000) which are obtained by reacting one or more alkylene oxides having a molecular weight between about 44 and 250 with one or more low molecular weight aliphatic glycols having molecular weights between 62 and 350. Representative alkylene oxides include ethylene oxide, propylene oxide, 1,2-epoxybutane, 1,2 - epoxyhexane, 1,2 - epoxyoctane, 1,2-epoxyhexadecane. 2,3 - epoxybutane, 3,4 - epoxyhexane, 1,2-epoxy-3-hexene and 1,2-epoxy-3-butene. In addition to mixtures of these oxides, minor proportions of alkylene oxides having cyclic substituents may be present such as styrene oxide, cyclohexene oxide, 1,2-epoxy-2-cyclohexylpropane, and α-methyl styrene oxide. The aliphatic polyols having molecular weights between about 62 and 350 include the compounds listed hereinafter. Representative polyols include ethylene glycol, propylene glycol, trimethylene glycol, 1,2-butylene glycol, 1,3-butanediol, 1,4-butanediol, 1,5-pentanediol, 1,2-hexylene glycol, 1,10-decanediol, 1,2-cyclohexanediol, 2-butene-1,4-diol, 2,2-dimethyl-1,3-propanediol, 3-cyclohexene-1,1 - dimethanol, 4-methyl-3-cyclohexene-1,1-dimethanol, 3-methylene-1,5-pentanediol, diethylene glycol, (2-hydroxyethoxy)-1-propanol, 4-(2-hydroxyethoxy)-1-butanol, 1-(2-hydroxypropoxy) - 2-octanol, 3-allyloxy-1,5-pentanediol, 2-[(allyloxy)methyl]-2-methyl-1,3-propanediol, [(4-pentenyloxy)methyl]-1,3-propanediol, 2-methyl-2-[(10-undecenyloxy)methyl] 1,3-propanediol, 3-(o-propenylphenoxy)-1,2-propanediol, thiodiglycol, 2,2′[thiobis(ethyleneoxy)]diethanol, 2,2′-isopropylidenebis(p - phenyleneoxy) diethanol. Mixtures of two or more of these polyols may be employed if desired.

The following classes are representative of the hydroxyl-terminated polymers which can be used in the present invention: the hydroxyl-terminated polyhydrocarbons which are described in U.S. Patent 2,877,212; the hydroxyl-terminated polyformals which are described in U.S. Patent 2,870,097; the hydroxyl-terminated polyesters which are described in U.S. Patent 2,698,838; U.S. Patent 2,921,915; U.S. 2,591,884; U.S. 2,866,762; U.S. 2,850,-476; U.S. 2,602,783; U.S. 2,729,618; U.S. 2,779,689; U.S. 2,811,493; and U.S. 2,621,166; the hydroxyl-methyl-terminated perfluoromethylenes which are described in U.S. Patent 2,911,390 and U.S. Patent 2,902,473; the polyalkyleneether glycols which are described in U.S. Patent 2,808,391 and British Patent 733,624; the polyalkylene-aryleneether glycols which are described in U.S. Patent 2,808,391.

The aliphatic polyols which may optionally be employed (up to 1 mole per mole of polymeric glycol) in preparing the novel polyurethane polymers of this invention should have a number average molecular weight ranging from about 62 to 350. Representative glycols include ethylene glycol; propylene glycol; trimethylene glycol; 1,2-butylene glycol; 1,3-butanediol, 1,4-butanediol; 1,5-pentanediol; 1,2-hexylene glycol; 1,10-decanediol; 1,2-cyclohexanediol; 2-butene-1,4-diol; 3-cyclohexene-1,1 - dimethanol; 4-methyl-3-cyclohexene-1,1-dimethanol and 3-methylene-1,5-pentanediol.

Further examples of aliphatic polyols include alkylene oxide modified diols such as diethylene glycol; (2-hydroxyethoxy)-1 - propanol; 4-(2-hydroxyethoxy)-1-butanol; 5-(2-hydroxyethoxy)-1-pentanol; 3-(2-hydroxypropoxy)-1-propanol; 4-(2-hydroxypropoxy)-1-butanol; 5-(2-hydroxypropoxy)-1-pentanol; 1-(2-hydroxyethoxy)-2 butanol; 1-(2-hydroxyethoxy)-2-pentanol; 1-(2-hydroxymethoxy)-2-hexanol; 1-(2-hydroxyethoxy)-2-octanol; 1-(2-hydroxypropoxy)-2-butanol; 1-(2-hydroxypropoxy)-2-propanol; 1-(2-hydroxypropoxy)-2-hexanol and 1-(2-hydroxypropoxy)-2-octanol. Representative examples of ethylenically unsaturated low molecular weight diols include 3-allyloxy-1,5-pentanediol; 3-allyloxy-1,2-propanediol; 2-allyloxymethyl-2-methyl-1,3-propanediol; 2-methyl-2-[(4-pentenyloxy)methyl]-1,3-propanediol and 3-(o-propenylphenoxy)-1,2-propanediol; others are listed in U.S. Patents 2,927,098 and 2,854,486. Representative examples of low molecular weight polyols having at least 3 hydroxyl groups include: glycerol; 1,2,6-hexanetriol; 1,1,1-trimethylolpropane; 1,1,1-trimethylolethane; pentaerythritol; 3-(2-hydroxyethoxy)-1,2-propanediol; 3-(2-hydroxypropoxy)-1,2-propanediol; 6-(2-hydroxyethoxy)-1,2-hexanediol; 6-(2-hydroxypropoxy)-1,2-hexanediol and 2,4-dimethyl-2-(2-hydroxyethoxy)methyl-pentanediol-1,5; mannitol; galactitol; talitol; iditol; allitol; altritol; gulitol; arabitol; ribitol; xylitol; lyxitol; erythritol; threitol; 1,2,5,6-tetrahydroxyhexane; meso-inositol; sucrose; glucose; galactose; mannose; fructose; xylose; arabinose; dihydroxyacetone; glucose-α-methyl-glucoside; 1,1,1-tris[-(2-hydroxyethoxy)methyl]ethane and 1,1,1-tris[(2-hydroxypropoxy)methyl]propane. Other examples are included in U.S. Patent 2,917,468.

The cured polyurethane polymers of this invention have many varied applications. They display excellent modulus and tear strength at room temperature and exhibit outstanding over-all properties at elevated temperatures. They are particularly useful for machine parts, potting and incapsulation of electronic equipment, and as a metal replacement. Among the many articles and uses to which these cured products are applicable may be mentioned the following: solid tires; mechanical goods, molded, lathe cut, stamped out, cast or dipped, such as grommets, sealing rings, channel rubbers, packing gaskets mountings, matting (floor covering), tile, rolls, oil-well swabs, pipe-wipers, slush pump pistons, packers, tractor cleats, tank tread blocks, etc.; footwear, heels; coated fabrics of cotton, glass fibers, rayon, wool, polyacrylonitrile, polyester fibers, leather, paper, plastics; films in the form of sheeting, wrapping film, etc.; coating compositions for wood, metal, plastic, concrete, brick, ceramics, leather, etc.; cellular products which may be self-blown or expanded with a blowing agent for use as vibration dampers or shock absorbers.

The following examples will better illustrate the nature of the present invention; however, the invention is not intended to be limited to these examples. Parts are by weight unless otherwise indicated.

Vulcanizate properties were measured at the temperatures indicated in accordance with the following procedures:

| | ASTM method |
|---|---|
| Durometer A hardness (25° C.) | D676–58T |
| Yerzley resilience (25° C.) | D945–55 |
| Tear resistance (25° C.) | D470 |

EXAMPLE 1

A. *Preparation of bis(beta-hydroxyethyl)carbamate from ethylene carbonate and hexamethylenediamine*

Hexamethylenediamine (132 parts) was dissolved in a mixture of ethylene carbonate (200 parts) and tetrahydrofuran (100 parts) and stired at reflux (about 65° C.) at atmospheric pressure for 1 hour. Soldification occured. The tetrahydrofuran was then removed under vacuum (final temperature 165° C.) to give 328 parts of the bis(beta-hydroxyethyl)carbamate. Melting point 82–85° C. *Analysis.*—Calculated for $C_{12}H_{24}N_2O_6$: percent nitrogen, 9.6; hydroxyl number, 384; molecular weight, 292. Found: percent nitrogen 9.4; hydroxyl number, 386.

B. *Preparation of bis(beta-hydroxyethyl)carbamate from ethylene carbonate and piperazine*

The procedure of part A above was repeated using piperazine (100 parts), ethylene carbonate (202 parts), and tertahydroduran (100 parts). Removal of the tetrahydrofuran gave 300 parts of the bis(beta-hydroxyethyl)-carbamate melting 93–94° C. *Analysis.*—Calculated for $C_{10}H_{18}N_2O_6$: Percent nitrogen, 10.7; hydroxyl number, 428; molecular weight, 262. Found: Percent nitrogen, 10.8; hydroxyl number, 438; molecular weight, 253 and 258.

C. *Preparation of polymer A*

A mixture consisting of toluene-2,4-diisocyanate (348.4 parts), 1,3-butanediol (45 parts) and anhydrous polytetramethyleneether glycol (number-average molecular weight 1,000) (500 parts) was agitated at 80° C. for 4 hours under protective nitrogen atmosphere in a dry reaction vessel. Polymer A thereby obtained had a free NCO— group content 9.4% and a Brookfield viscosity at 30° C. of 8,100 cps.

D. *Preparation of cured polyurethanes by reaction of bis(beta-hydroxyethyl)carbamates and NCO— terminated polyurethanes*

After polymer A (100 parts) had been degassed at 90° C., the carbamate prepared in part A above (32 parts) and triethylenediamine catalyst (0.066 part) were rapidly introduced with stirring. The mixture thereby obtained was poured into a mold and cured therein for fourteen hours at 100° C.

A second vulcanizate was made by mixing polymer A, the carbamate prepared in part B above (29 parts), and triethylenediamine catalyst (0.066 part) and heating at 100° C. for six hours.

Table I, which follows, gives the properties exhibited by the resulting vulcanizates.

TABLE I

| | | |
|---|---|---|
| Polymer A (parts by weight) | 100 | 100 |
| Carbamate B (parts by weight) | 29 | |
| Carbamate A (parts by weight) | | 32 |
| Triethylenediamine (part by weight) | 0.066 | 0.066 |
| Cure Time (hours) | 6 | 14 |
| Vulcanizate Property: | | |
| $M_{100}$, 25° C. (p.s.i.) | 1,300 | 1,400 |
| $M_{300}$, 25° C. (p.s.i.) | 2,000 | 1,850 |
| $T_B$, 25° C. (p.s.i.) | 2,250 | 2,400 |
| $E_B$, 25° C. (percent) | 450 | 350 |
| Durometer A Hardness | 94 | 91 |
| Tear Strength, 25° C. (lb./in.) | 105 | 68 |

EXAMPLE 2

A. Carbamate 2A was prepared in accordance with the general procedure of Example 1, part A, above using the following formulation

| | Carbamate 2A |
|---|---|
| m-Xylylenediamine | 136 |
| Ethylene carbonate | 176 |
| Tetrahydrofuran | 200 |

Carbamate 2A (313 parts) was a viscous liquid. *Analysis.*—Found: percent nitrogen, 8.9; hydroxyl number, 347, 358; molecular weight, 309, 314; percent water, 0.4, 0.5.

B. *Preparation of polyurethane by the reaction of the bis(beta-hydroxyethyl)carbamate and NCO—terminated polyurethanes*

A curable mixture was prepared according to the following recipe:

| | |
|---|---|
| Polymer of part C of Example 1 | 100 |
| Carbamate 2A | 36.1 |

The carbamate was introduced with stirring into the NCO— terminated polyurethane at 50–60° C. The mixtures thereby obtained were degassed, poured into a mold and cured therein for 16 hours at 100° C. The resulting vulcanizate exhibited the following properties at 25° C.:

| | |
|---|---|
| $M_{100}$ (p.s.i.) | 1250 |
| $M_{300}$ (p.s.i.) | 2700 |
| $T_B$ (p.s.i.) | 2800 |
| $E_B$ (percent) | 350 |
| Shore A hardness | 90 |
| Shore D hardness | 45 |

As many widely different embodiments of this invention may be made without departing from the spirit and scope thereof, it is to be understood that this invention is not limited to the specific embodiments thereof except as defined in the appended claims.

The embodiments of this invention in which an exclusive property or privilege is claimed are defined as follows:

1. A process for the production of a cured polyurethane polymer comprising reacting about 1.0 mole of a polymeric glycol having a molecular weight between about 750 and 10,000, an organic polyisocyanate; 0 to 1.0 mole of an aliphatic polyol having a molecular weight less than 350; and up to about 2.0 moles of a bis(beta-hydroxylalkyl)carbamate having the structure

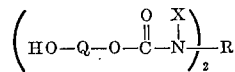

where R is a divalent radical selected from the group consisting of saturated hydrocarbons of 2 to 10 carbon atoms and unsubstituted xylylene; X is a member of the group consisting of hydrogen, alkyl, and when both X's are taken together alkylene thereby connecting the N atoms to which the individual X's are attached and forming a heterocyclic diamine; and Q is a member selected from the group consisting of —CH₂—CH₂— and

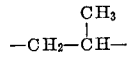

with the proviso that the total number of —NCO groups to the number of —OH groups of said reactants has a value ranging from 1.0 to 1.2.

2. A process as defined in claim 1 wherein said carbamate structure R is a divalent aliphatic saturated hydrocarbon radical of six carbon atoms, X is hydrogen, and Q is —CH₂—CH₂—.

3. A process as defined in claim 1 wherein said carbamate structure R is a divalent aliphatic saturated hydrocarbon radical of two carbon atoms, said X's are taken together and is ethylene thereby forming with the nitrogens to which it is attached a heterocyclic diamine, and Q is —CH₂—CH₂—.

4. A process as defined in claim 1 wherein said reaction is carried out at a temperature of from about 50° C. to about 160° C.

5. A process as defined in claim 1 wherein said polymeric glycol is polytetramethylene ether glycol.

6. A process as defined in claim 1 wherein said organic polyisocyanate is toluene-2,4-diisocyanate.

7. A process as defined in claim 1 wherein said aliphatic polyol is 1,3-butanediol.

8. A cured polyurethane polymer as prepared by the process as defined in claim 1.

9. A process for the production of a cured polyurethane polymer comprising reacting about 1.0 mole of polytetramethyleneether glycol having a molecular weight between about 750 and 10,000; toluene-2,4-diisocyanate, 0 to 1.0 mole of 1,3-butanediol; and up to about 2.0 moles of a bis(beta-hydroxyalkyl)carbamate have the structure

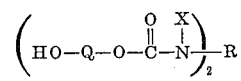

where R is a divalent radical selected from the group consisting of saturated hydrocarbons of 2 to 10 carbon atoms and unsubstituted xylylene; X is a member of the group consisting of hydrogen, alkyl, and when both X's are taken together alkylene thereby connecting the N atoms to which the individual X's are attached and forming a heterocyclic diamine; and Q is a member selected from the group consisting of —CH₂—CH₂— and

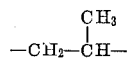

with the proviso that the total number of —NCO groups to the number of —OH groups of said reactants has a value ranging from 1.0 to 1.2.

References Cited by the Examiner

UNITED STATES PATENTS

| | | | |
|---|---|---|---|
| 2,464,519 | 3/1949 | Lichty | 260—482 |
| 2,784,163 | 3/1957 | Reynolds | 260—482 |
| 2,802,022 | 8/1957 | Groszor | 260—482 |
| 2,987,504 | 6/1961 | Wagner | 260—77.5 |

OTHER REFERENCES

Chemical Abstracts, vol. 52, paragraph 9667e.

LEON J. BERCOVITZ, *Primary Examiner.*